(12) United States Patent
Porco et al.

(10) Patent No.: US 7,020,215 B2
(45) Date of Patent: *Mar. 28, 2006

(54) METHOD AND APPARATUS FOR REDUCING TRANSMITTER PEAK POWER REQUIREMENTS USING DUAL MATRICES

(75) Inventors: Ronald L. Porco, Fort Worth, TX (US); William C. Greenwood, Trophy Club, TX (US); Glen A. Franson, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 701 days.

This patent is subject to a terminal disclaimer.

(21) Appl. No.: 10/102,246

(22) Filed: Mar. 19, 2002

(65) Prior Publication Data

US 2003/0179833 A1 Sep. 25, 2003

(51) Int. Cl.
*H04L 25/03* (2006.01)

(52) U.S. Cl. .................................. 375/297

(58) Field of Classification Search ........ 375/295–297, 375/130, 146, 140, 260, 222; 455/114.3; 398/193; 370/321, 335, 336, 342, 344, 347, 370/441, 442
See application file for complete search history.

(56) References Cited

U.S. PATENT DOCUMENTS

| 5,287,387 A | 2/1994 | Birchler ...................... 375/60 |
|---|---|---|
| 5,604,462 A | 2/1997 | Gans et al. .............. 330/124 R |
| 5,638,403 A | 6/1997 | Birchler et al. ............. 375/296 |
| 5,783,969 A | 7/1998 | Luz ........................ 330/124 R |
| 5,834,972 A | 11/1998 | Schiemenz, Jr. et al. ...................... 330/124 R |
| 5,920,808 A * | 7/1999 | Jones et al. .............. 455/127.1 |
| 5,933,766 A | 8/1999 | Dent .......................... 455/103 |
| 6,128,351 A * | 10/2000 | Jones et al. ................. 375/284 |
| 6,381,212 B1* | 4/2002 | Larkin ........................ 370/210 |
| 2002/0118767 A1* | 8/2002 | Ylamurto .................... 375/261 |

FOREIGN PATENT DOCUMENTS

EP 0966099 A1 12/1999

* cited by examiner

*Primary Examiner*—Tesfaldet Bocure
(74) *Attorney, Agent, or Firm*—Kevin D. Wills (57) ABSTRACT

An apparatus and method thereof for processing base band signals to reduce peak power requirements for a multichannel transmitter is disclosed. The apparatus includes a first Fourier Transform Matrix (FTM) coupled to one or more input signals for providing a plurality of output signals; a processing unit for limiting a peak value for each of the output signals, and a second FTM for decomposing the peak limited output signals to provide one or more output base band signals, each of the output base band signals corresponding to one of the input signals. A multi-channel transmitter further converts the output base band signals to a radio frequency signals; a first analog FTM provides a plurality of amplifier input signals; a power amplifier having a plurality of amplifiers provides a plurality of amplified output signals; and a second analog FTM coupled to the amplified output signals provides transmit signals corresponding one to one with the output base band signals.

26 Claims, 7 Drawing Sheets

METHOD AND APPARATUS FOR REDUCING TRANSMITTER PEAK POWER REQUIREMENTS USING DUAL MATRICES

FIELD OF THE INVENTION

This invention relates in general to communication systems, and more specifically to a method and apparatus for reducing peak power requirements in transmitters within such systems using Transform Matrices.

BACKGROUND OF THE INVENTION

Communications systems and particularly wireless communications systems require transmitters in one form or another. Transmitters and particularly higher power transmitters, specifically power amplifiers (PAs), are one of the more expensive and more highly stressed, from a power perspective, components of a communications system. By virtue of the PAs relatively intimate coupling to an antenna system they are subject to abuse due, for example, to antenna irregularities, such as mismatches and weather or lightning events. For these reasons transmitters or power amplifiers are subject to or often experience relatively higher failure rates than some system components. These higher power transmitters are typically found in base stations. Base stations, such as those found in cellular or like communications system are a key link in providing satisfactory service for hundreds and possibly thousands of customers.

Therefore carriers or service providers or network operators cannot afford to have a transmitter failure and will go to great lengths to avoid failures or at least service outages when there is a failure. Hence most base station suppliers utilize some form of redundancy for power amplifiers within the base stations they provide to the marketplace. More recently some manufacturers have been using radio frequency Fourier Transform Matrices (FTMs) to provide this redundancy. FTMs combine phase shifted versions of input signals to provide multiple output signals which are then amplified and passed through another radio frequency FTM to decompose the amplified signals into amplified versions of the original input signals. Thus if a PA fails, the remaining PAs will continue to amplify the input signals and provide amplified signals thus avoiding service outages. This may be more economical than having full redundancy for each power amplifier. However, there is still a problem.

Many communications systems today require linear PAs because they rely on complex modulation schemes that specify amplitude and phase variations in the transmitted radio signals. Even systems that do not per se require linear PAs, but use FTMs, will find amplitude variations in the combined phase shifted signals that are to be amplified and thus need linear PAs. Linear PAs are very difficult and expensive to construct. Limiting the range of output, thus input, signals over which the amplifier must demonstrate a degree of linearity can control or contain costs and difficulties. In conventional amplifier systems there are known techniques for processing the input signals to assist with these goals, however there are no known techniques that work when FTMs are employed. What is needed is a method and apparatus for reducing peak power requirements in transmitters, specifically multi-channel transmitters using FTMs.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

In overview form the present disclosure concerns communications systems that utilize transmitters to provide service to communications units or more specifically user thereof operating therein. More particularly various inventive concepts and principles embodied in methods and apparatus for the reduction of peak power requirements for transmitters are discussed and disclosed. The communications systems of particular interest are those being deployed and developed such as GSM, GPRS, EDGE, TETRA, iDEN, CDMA, W-CDMA, CDMA2000, 2.5G, or 3G systems that use modulation formats such as QPSK, DQPSK, OQPSK, BPSK, QAM, and spread spectrum or variations and evolutions thereof that require cost effective high availability linear transmitters.

As further discussed below various inventive principles and combinations thereof are advantageously employed to essentially construct and process at base band the signals that the amplifiers will encounter, thus alleviating various problems associated with known systems while still facilitating cost effective, high performance and high availability transmitters provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore further discussion of such software and ICs, if any, will be limited to the essentials with respect to the principles and concepts of the preferred embodiments, in the interest of brevity and minimization of any risk of obscuring the principles and concepts in accordance with the present invention.

Figure 1:
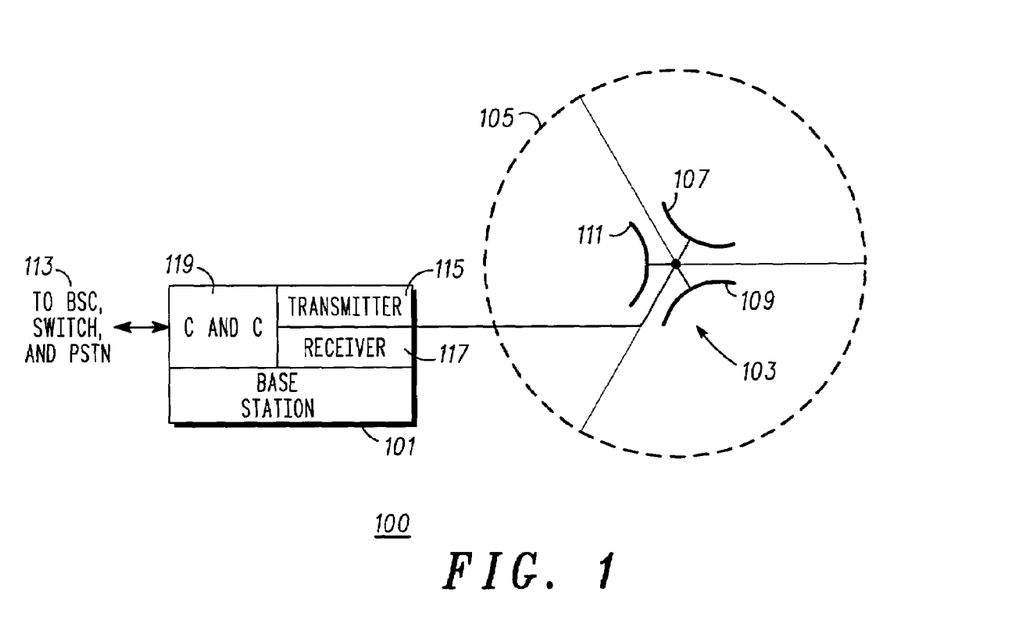
FIG. 1 depicts a simplified diagram of a portion of a communications system suitable for employing an embodiment according to the present invention.

Referring to FIG. 1 a simplified diagram of a portion 100 of a communications system will be described. FIG. 1 shows a base station 101 inter-coupled to an antenna system 103 to provide coverage to users within the general coverage area 105. The antenna system 103, depicted, is a sector gain system with 3 sectors 107, 109, 111 depicted, each covering, nominally, 120 degrees, although other arrangements such as 6 sectors, etc. would be appropriate. Ordinarily the base station will supply entirely different signals to each sector of the antenna and possibly multiple signals to one or more of the sectors. Even when an omni directional antenna is used the station will often need to supply multiple signals to the omni directional structure. In any event the base station is further coupled at 113 to a base site controller and switch and eventually the Public Switched Telephone System typically via a dedicated link such as a T1 terrestrial link or the like.

Essentially the base station handles the radio links to and from subscriber devices or users of portable or mobile equipment and the land or terrestrial based portions of the systems or networks. Generally the base stations can be thought of as including and inter-coupled a communications and control function 119, a receiver function 117 and a transmitter function 115. Each of these functions can be quite complex in there own right and comprise redundant systems. The receiver and transmitter functions or blocks will inevitably include tens of receivers and transmitters. These stations and antenna systems are generally known and available from multiple suppliers, such as Motorola, etc., and when the transmitters are modified and constructed according to the principles and concepts disclosed herein improved performance and cost advantages can be realized.

Figure 2:
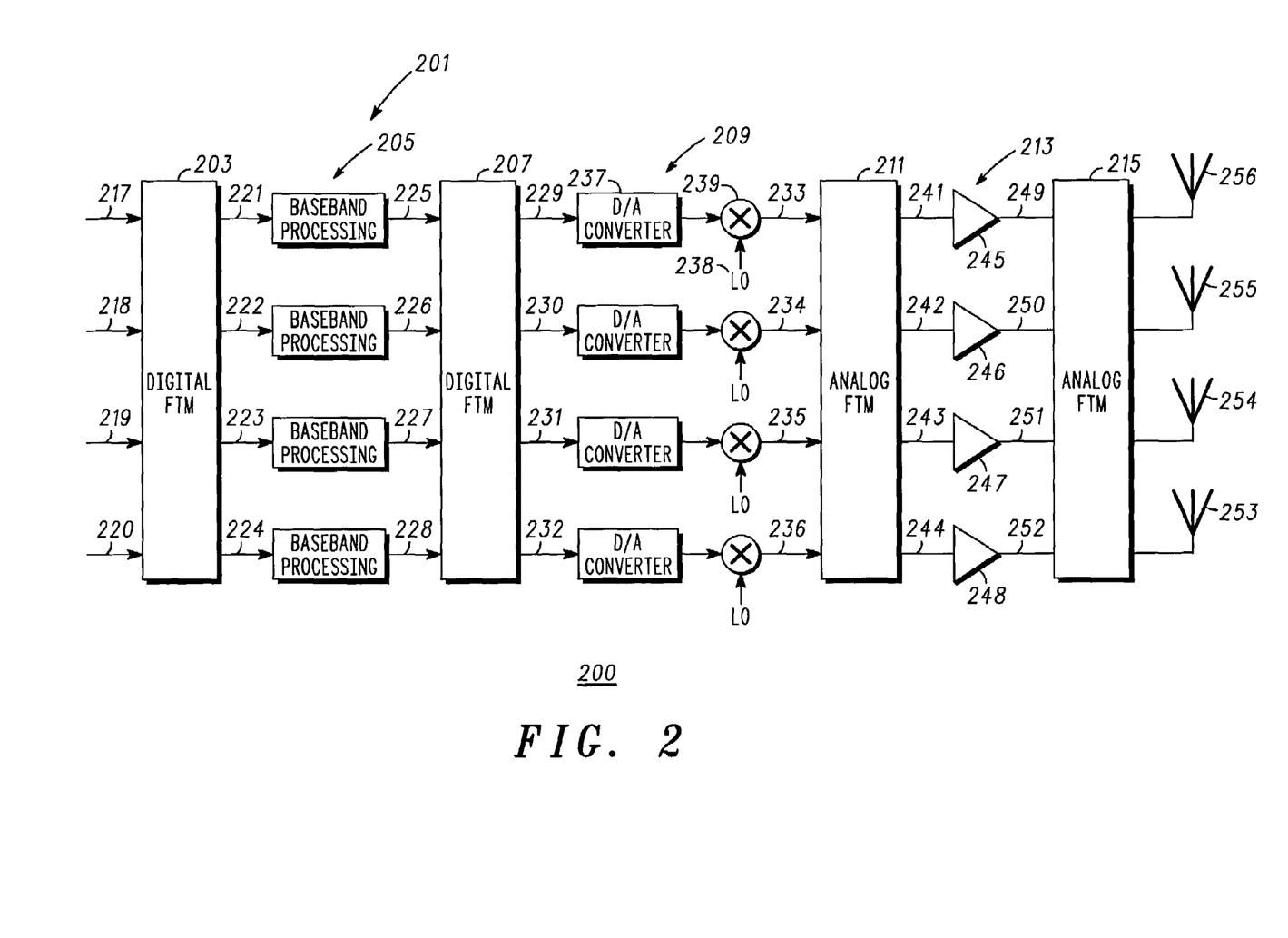
FIG. 2 depicts a simplified block diagram of a preferred embodiment of a transmitter according to the present invention.

Referring to FIG. 2, a simplified block diagram of a preferred embodiment of a transmitter 200 will now be discussed and described. The FIG. 2 transmitter is a multi-channel transmitter having reduced peak power requirements. Multi-channel transmitter is used to describe a transmitter having multiple parallel paths and amplifier stages such as may be encountered or may be particularly well suited for amplifying signals produced by a Fourier Transform Matrix (FTM) or for driving a FTM. Generally the reduced peak power requirement is accomplished by limiting the peak to average ratios (PARs) for the signals that are presented to the amplifiers, then amplified, and thus the amplified signals. The peak to average is limited at base band but rather than limiting the PAR of the input signals as is traditional they are first passed through a base band FTM, processed, and passed through a second base band FTM.

The multi-channel transmitter having reduced peak power requirements includes an apparatus 201 for processing base band signals to reduce peak to average parameters. This apparatus includes a Fourier Transform Matrix (FTM) 203 coupled to at least one input signals and from there coupled to a processing unit 205 that limits peak values and provides peak limited output signals to a second FTM 207 that decomposes the peak limited output signals to provide output base band signals to a mixer 209. The mixer 209 converts these base band signals to radio frequency signals that are coupled to a first analog FTM 211 that provides amplifier input signals comprising combinations of phase shifted versions of the radio frequency signals. These amplifier input signals are amplified by an amplifier 213 and then the amplified output signals are decomposed or perhaps more accurately re-composed at or by a radio frequency or second analog FTM 215 to provide transmit signals for driving an antenna structure. To reproduce the peak limited signals 225–228 at the input of amplifier 213 it is necessary to connect the outputs of mixers to the correct input ports of the first analog FTM 211. Selecting the proper input configuration will be apparent with minimal experimentation to one of ordinary skill in the art.

In more detail the FTM 203 and FTM 207, preferably are digital FTMs that are implemented in software via a Digital Signal Processor (DSP) or an Application Specific Integrated Circuit (ASIC) or combination thereof. The FTM 203 is coupled to the at least one input signal 217 and preferably a plurality of such signals 217–220 and provides a plurality of output signals or FTM output signals 221–224, where each of the FTM output signals comprises a combination of phase shifted versions of the at least one input signal and preferably plurality of input signals according to FTM techniques further discussed below. Note that in one embodiment an input, such as 217 may be terminated or not otherwise used while inputs 218–220 would be coupled, respectively, to base band input signals such as, base band signals for driving each of three sectors 107, 109, 111. In this embodiment the output from the second analog FTM 215 shown driving antenna 256 would be terminated and sectors 107, 109, 111 would correspond to and be served by, respectively, the antennas 255, 254, 253. The input signal or signals is preferably a base band signal or signals intended for transmission on one or more radio channels with a channel here being interpreted as one or more carriers intended to provide coverage in or to a particular coverage area. A typical example would be a plurality of input signals each comprising a code division, time division, or frequency division multiple access base band signal intended for transmission, on one or more carrier frequencies, within one sector of a plurality of sectors, such as 107, 109, or 111. Although this may be typical the principles and concepts herein discussed will have application and be equally advantageous, regardless of the particular form of modulation and channel access employed provided of course that the modulation can withstand or to the extent that the modulation can withstand the inevitable distortion that results from the peak limiting action. For example, besides CDMA the modulation and access methodologies, such as TDMA or FDMA, thus base band signals, used variously for GSM, GPRS, EDGE, TETRA, iDEN, CDMA, W-CDMA, CDMA2000, 2.5G, or 3G will work equally well. As farther discussed below the apparatus 205 may include a signal selector for selecting a plurality of input signals to be coupled to the first FTM 203 and this signal selector can operate to select the plurality of input signals to correspond to base band signals for a plurality of sector antennas, such as 107, 109, 111 that are driven by the multi-channel transmitter.

The processing unit 205 further includes a plurality of base band processing functions (four depicted) that are each coupled to one of the plurality of FTM output signals 221–224. The processing unit operates to process the FTM signal in a manner that makes it more compatible with or less demanding on a linear power amplifier. One example of such processing is limiting a peak value or all peak values for each of the plurality of FTM output signals to provide a plurality of peak limited output signals 225–228. As will be discussed in more detail with reference to FIGS. 3–6, a preferred approach for doing this limiting is through the use of a clipping function that operates to limit peaks of each of the FTM output signals. Preferably this clipping function is a so called windowed clipping function that operates to limit peaks according to a predetermined function that lowers the probability that a peak value will exceed a predetermined value for each of the peak limited output signals 225–228.

It has been shown that further improvement in performance of the amplifiers or transmitter can be realized if the clipping function is followed by a filter that is coupled to an output of the clipping function to reduce undesired signals resulting from the clipping function. Additional improvement has been realized in some instances when the filter is followed by a second clipping function that is coupled to an output of the filter and that operates to further limit peaks of a filtered version of each of the FTM output signals. This is usually considered a light clipper in that a comparatively smaller percentage of peaks are clipped or limited.

In any event the peak limited output signals are coupled to the second FTM 207 and it operates to decompose the peak limited output signals to provide at least one and preferably a plurality of output base band signals 229–232, each corresponding one for one and respectively to the input signals 220–217, where the reversal in order is a result of the FTM processes. That is the output at 232 corresponds to the input at 217 and so on. Thus for each input base band signal at FTM 203 there will be one output base band signal at FTM 207.

These output base band signals are coupled to the mixer 209 where they are converted to a plurality of radio frequency signals 233–236. As depicted the mixer 209 is comprised of four mixers each coupled to one of the output base band signals from the second FTM and each providing a corresponding one of the radio frequency signals 233–236. Referring to the top mixer and recognizing that each of the four is similar, the output base band signal is converted to an analog signal by digital to analog converter 237 followed by appropriate filtering (not specifically shown) and this analog signal and a LO signal 238 are applied to a generally known mixer 239 for up-conversion of the frequency of the analog signal to a radio frequency suitable for transmission all generally known and so as to generate and provide radio frequency signal 233. Each of the output base band signals is converted from a base band frequency or bit rate of up to a few megabits per second to an analog signal at a transmission radio frequency of, for example, either 800 to 1000 MHz or 1.8 GHz to 2.2 GHz or more.

Further included in the multi-channel transmitter is the first analog FTM 211 which is coupled to the at least one and preferably plurality of radio frequency signals 233–236 and operable to provide a plurality of amplifier input signals 241–244, each comprising a combination of phase shifted versions of the one or more radio frequency signals. These are applied to the power amplifier 213 that includes a plurality of amplifiers 245–248 coupled to the plurality of amplifier input signals 241–244, each amplifier having an input coupled to one of the amplifier input signals where each of these signals, preferably, correspond to one of the peak limited output signals 225–228. Each amplifier is operable to amplify the input signal and provide an amplified output signal, wherein the plurality of amplifiers 245–248 provide a plurality of amplified output signals 249–252, respectively.

One last element of the transmitter is the radio frequency or analog FTM 215 that is coupled to the plurality of amplified output signals 249–252 to provide at least one transmit signal 256 corresponding one to one with the at least one input signal 217 and preferably a plurality of transmitter signals for driving antennas 256–253 corresponding one to one and respectively with the input signals 217–220. Basically the analog FTM 215 decomposes the combinations of phase shifted versions of the radio frequency signals that have been amplified back into their respective original content. The reversal in order as noted earlier is a result of going through two sets of dual FTMs. By way of further example the signal at 217 corresponds to the signal at 232 and 236 and 256. Note that while this disclosure has been developed around the use of 4×4 matrices the principles and concepts disclosed and described apply to essentially any size matrix and the matrix need not be square as here. Analog FTMs are known and available in various dimensions such as here a 4×4 matrix from suppliers such as Anaren Microwave. The FTM is a series of hybrid combiners that combines the input signals at specific phase angles. The typical bandwidth for the matrix is 200 MHz with an insertion loss of 0.5 dB.

In any event, as described and discussed the multi-channel transmitter is preferably arranged and constructed for transmitting code division, time division, or frequency division multiple access signals on multiple sectors. The input FTM and output FTM are, preferably, digital FTMs with one or more base band input signals at the input FTM, while the processing unit includes, preferably, a windowed clipping function, and the radio frequency FTMs 211, 215 that are analog FTMs. In this fashion the base band signals are processed at base band in a form that represents the signals input to the plurality of radio frequency amplifiers in order to limit the demands on the plurality of power amplifiers thus reducing the peak power requirements for the multi-channel amplifier. A couple of factors related to apparent cost and complexity of this approach suggest that it is far from intuitive. For example the digital FTM 207 and analog FTM 211 appear to be extra cost. However by using the extra base band FTM and RF FTM the transmitter only requires as many mixer lineups as there are input signals to the input FTM 203. Also this base band processing circuit is fully compatible with legacy equipment where the RF FTMs and parallel amplifiers were used largely to provide amplifier redundancy.

Figure 3:
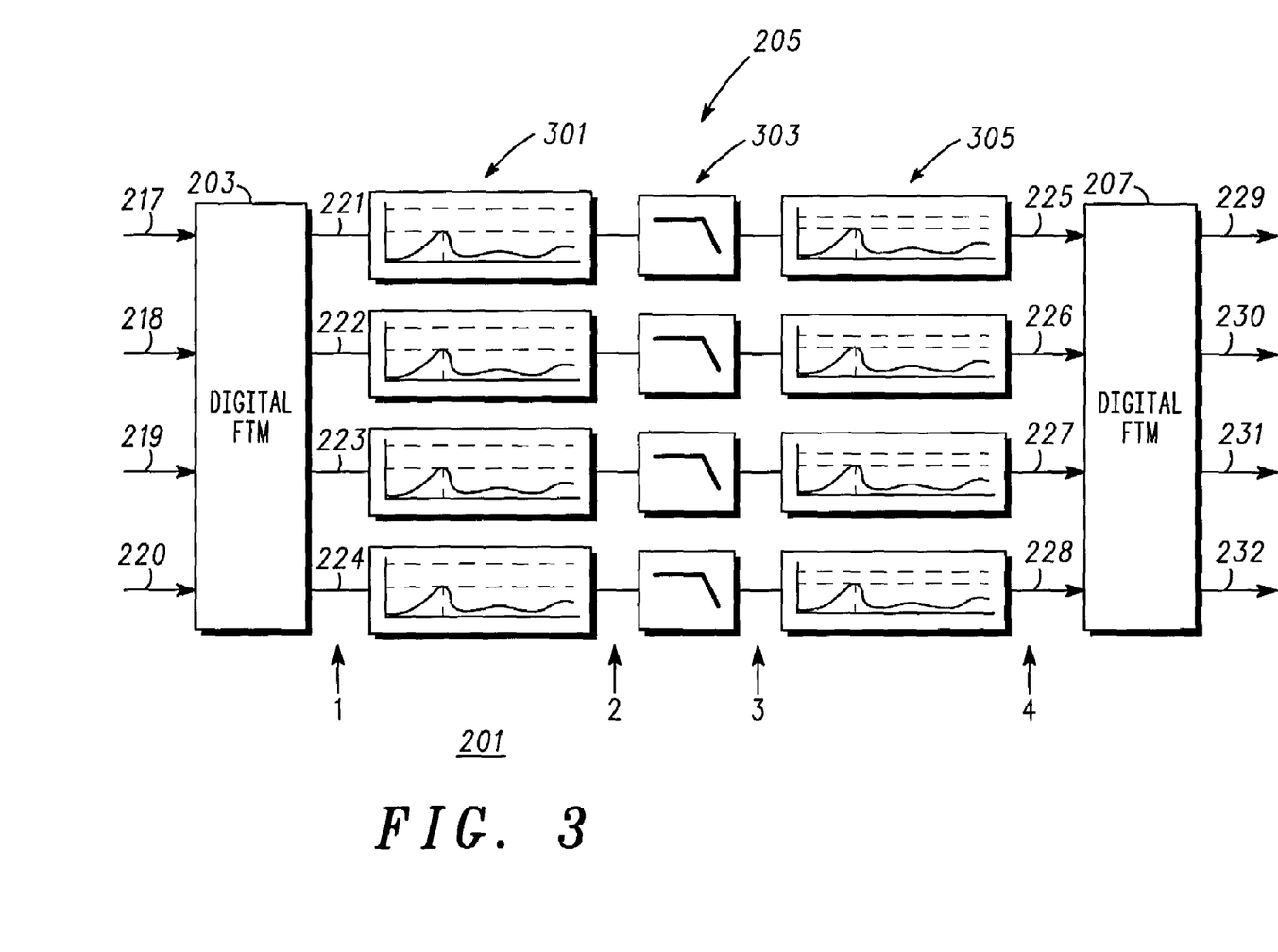
FIG. 3 illustrates a block diagram of an apparatus to reduce peak power requirements suitable for use in the FIG. 2 transmitter in accordance with the present invention.

Referring to FIG. 3, a block diagram of a preferred embodiment of an apparatus 201 for processing base band signals to reduce peak to average ratios or peak power requirements that is suitable for use in the transmitter described above will now be discussed and described. Some of this discussion will be in the nature of a review while some will elaborate on various functions and processes described briefly earlier. The apparatus 201 is for reducing peak power requirements of a multi-channel transmitter and it does so by reducing Peak to Average Ratios (PARs) of signals that are representative in amplitude characteristics of the signals that will be applied to each power amplifier in the multi-channel transmitter. The apparatus includes the Fourier Transform Matrix (FTM) 203, mentioned above, that is coupled to at least one input signal 217 and preferably a plurality of input signals 217–220. The FTM 203 is, preferably a digital FTM, for providing a plurality of output signals 221–224 where each comprises a combination of phase shifted versions of the one or more input signals. Additionally included in the apparatus 201 is the processing unit 205 that is coupled to the plurality of output signals 221–224 that operate to or for limiting a peak value for each of the plurality of output signals in order to provide a plurality of peak limited output signals 225–228. The peak limited output signals are coupled to the inputs of a second FTM 207, preferably a second digital FTM that is operable for decomposing the peak limited output signals to provide a plurality of output base band signals 229–232 that are suitable for generating a plurality of low level signals, specifically radio frequency signals, for driving the analog FTM 211 and thus the multi-channel transmitter, each of the output base band signals corresponding to one of the input signals.

The peak to average reduction apparatus, specifically the digital FTM 203 is preferably coupled to a plurality of input signals each comprising a base band signal, such as a code division, time division, or frequency division multiple access base band signal, intended for transmission on a radio channel such as on one sector of a plurality of sectors or one sector antenna of a multiple sector antenna structure. As we will discuss later these input signals may be provided using a signal selector for selecting the plurality of input signals to be coupled to the first FTM. In one embodiment, the signal selector operates to select the plurality of input signals corresponding to base band signals for a plurality of sectors that are driven by the multi-channel transmitter. Note one base band signal for example, IS-95 CDMA, as is known, can include pilot, paging, and sync signals, and as many as 61 voice or data payload signals for each of multiple carriers. A typical bit rate for a IS-95 base band signal is approximately 1.3 M bits per second and other versions of CDMA can go much higher.

As depicted the apparatus or processing unit 205, preferably, includes a clipping function 301 comprising, but not limited to, four blocks or one per output signal 221–224, that operate to limit peaks of each of the output signals. This clipping function 301 is preferably a windowed clipping function that operates to perform a relatively heavy clip to limit peaks according to a predetermined function that lowers the probability that peak values will exceed a predetermined value for each of the output signals. Following the clipping function is preferably a filter 303 coupled to an output of each of the clipping functions 301 and operating to reduce undesired and higher frequency signals resulting from the clipping function. Following the filter is, preferably, a second clipping function 305 coupled to an output of each of the filters 303 that operates, preferably analogously with clipper 301 however at a much lighter clip level, to further limit peaks of each of the output signals 225–228. Advantageously the peak to average reduction apparatus 201 is suitable for implementation in an integrated circuit form as either a DSP or ASIC or combination of both as will be recognized by one of ordinary skill given the principles and concepts disclosed herein.

A 4×4 digital FTM can be described by the following matrix below:

|      | Vout1     | Vout2       | Vout3       | Vout4       |
|------|-----------|-------------|-------------|-------------|
| Vin1 | 0.5 ∠ 0   | 0.5 ∠ −90   | 0.5 ∠ −90   | 0.5 ∠ −180  |
| Vin2 | 0.5 ∠ −90 | 0.5 ∠ −180  | 0.5 ∠ 0     | 0.5 ∠ −90   |
| Vin3 | 0.5 ∠ −90 | 0.5 ∠ 0     | 0.5 ∠ −180  | 0.5 ∠ −90   |
| Vin4 | 0.5 ∠ −180| 0.5 ∠ 90    | 0.5 ∠ −90   | 0.5 ∠ 0     |

This can also be represented by the equations:

$$Vout1 = 0.5 \cdot Vin1 \angle 0° + 0.5 \cdot Vin2 \angle -90° + 0.5 \cdot Vin3 \angle -90° + 0.5 \cdot Vin4 \angle -180°$$

$$Vout2 = 0.5 \cdot Vin1 \angle -90° + 0.5 \cdot Vin2 \angle -180° + 0.5 \cdot Vin3 \angle 0° + 0.5 \cdot Vin4 \angle -90°$$

$$Vout3 = 0.5 \cdot Vin1 \angle -90° + 0.5 \cdot Vin2 \angle 0° + 0.5 \cdot Vin3 \angle -180° + 0.5 \cdot Vin4 \angle -90°$$

$$Vout4 = 0.5 \cdot Vin1 \angle -180° + 0.5 \cdot Vin2 \angle -90° + 0.5 \cdot Vin3 \angle -90° + 0.5 \cdot Vin4 \angle 0°$$

Either the matrix or the equations show the relationship between the output signals Vout and input signals Vin. It turns out to be reasonably straight forward to perform these calculations in a DSP.

Figure 4:
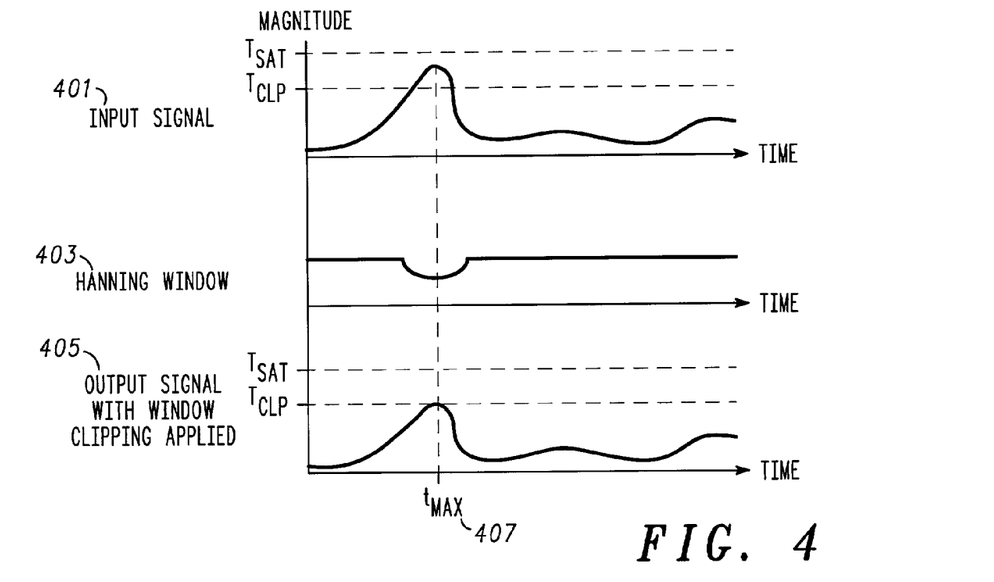
FIG. 4–FIG. 6 depict some operating waveforms and performance graphs of the FIG. 3 apparatus.

The clipping functions will now be described in more detail with reference to FIG. 4. First we will discuss some definitional material to give the reader a better appreciation for the clipping processes. The crest factor of a signal is defined as the ratio of peak power to average power. Although it is useful to know the peak to average ratio (PAR) of a signal, the cumulative distribution function (CDF) provides better insight as to the true statistical nature of the envelope power. The CDF and the complementary cumulative distribution function CCDF are defined by the following equations.

$$CDF = F(x) = \int_{-\infty}^{x} f(\xi) d\xi$$

$$CCDF = 1 - F(x)$$

Essentially, the CCDF is a plot of the PARs from 0 to 100%. It is convenient to work in terms of distribution functions since the peak level and the amount of time spent at and above the crest factor is important. Simply stated, the shape of the CCDF is important. For the purposes of this disclosure, crest factor will be defined as the PAR at 0.01%. For example, a 10 dB PAR will imply that there is a 0.01% probability that a signal power will be greater than 10 dB above the average power.

It is desirable that the clipping function limit the peaks of the signal and at the same time generate as little noise or splatter or undesirable signal power as possible. To produce a low splatter clip it is important that the discontinuities in the waveform be minimal. The windowed clipping algorithm is an excellent approach to satisfying these objectives. The clipping is implemented digitally in base band processing so that the data may be processed in non-real time. Various forms of windowed clipping algorithms will suit the purposes. Referring to FIG. 4 an algorithm is described that uses two thresholds to limit the peaks of the signal 401. The soft clipping threshold is designated as Tclp while the hard clip threshold is called Tsat. The user determines the values of these thresholds experimentally based on a particular system set up. The first step in the window clipping algorithm is to scan the input waveform for peaks that exceed the clip thresholds. Once the peak of a signal exceeding the thresholds has been identified either a hard clip or soft clip will be applied. The peak index in FIG. 4 is designated as $t_{max}$ 407. In the case of a soft clip the peak portion of the waveform is convolved with an inverted Hanning window 403. Various other types of windows will also work properly as those of ordinary skill in the art will realize. The equations below show the Hanning window, $h_j$, the window clipping function, $w_j$, and the window length, L.

$$h_j=[1-\cos(2\pi j/(L-1))]/2$$

$$w_j(n)=1+(c-1)\cdot h_j$$

$$j=0,1,2,\ldots,L-1$$

The window clipping function is calculated such that the peak at $t_{max}$ will be equal to the Tclp level after the window and signal have been convolved and this is shown at 405. Therefore, for any peak that exceeds Tclp but is less than Tsat a custom window will be calculated and applied to reduce the local maximum to the Tclp level. Substituting the following weight into the equation above will calculate the desired window function.

$$c=\sqrt{T_{CLP}}/|Input\_Signal(t_{max})|$$

There will be some discontinuities around the peak region since only that portion of the signal is being filtered but they should be substantially less than those associated with a hard clip.

At some point one may find that the window clipper is working so hard that it is producing as much splatter as a hard clip. If this is the case, then using a constant clipping weight rather than a variable clipping weight will be the best measure. The equation below describes the clipping weight for such a case.

$$c=\sqrt{T_{CLP}/T_{SAT}}$$

In the case of a hard clip the signal value will be changed to match the Tclp threshold.

The filter 303 was implemented in DSP form to have the following characteristics. The filter should have a flat pass band to preserve the characteristics of prior channel or pulse shaping filters. In addition a steep transition band and adequate attenuation are needed to ensure that the filtered waveform will meet channel specifications.

Figure 5:
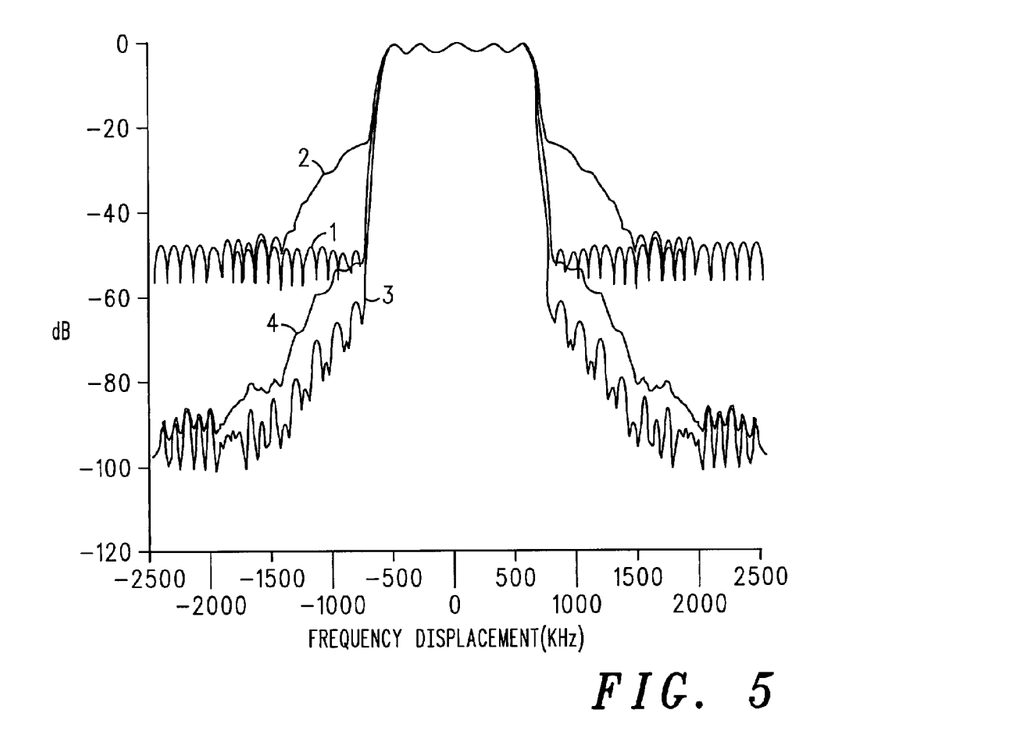

Referring to FIG. 5 the power spectral densities for the points marked 1–4 in FIG. 3 are shown. Recall that in the apparatus 201 of FIG. 3 two clipping functions 301, 305 are employed. The first clipping function's threshold value is set to a low level to produce a heavy clip. The output of the first clipper is filtered to eliminate the splatter that is generated from the heavy clipping function. After filtering, the resultant signal is clipped again. The second clipping function's threshold is set to clip the signal very lightly. There will be some spectral re-growth due to the second clip but it should be acceptable since the clip is light. This method allows the user to increase the peak to average ratio reduction at the expense of a slight degradation in adjacent channel power (ACP) at the power amplifier's respective inputs. However, if the power amplifier is operated at its rated power then it is likely that the non-linearities of the power amplifiers will produce adjacent channel splatter that exceeds that of there respective input signals. Therefore, the actual ACP performance seen at the antenna output may not be degraded at all by the inclusion of the second clipping function. On the contrary, the PAR reduction resulting from the second clipping function may result in an improved ACP at the antenna output even though the ACP at the power amplifier input is degraded.

Using the input to the first window clipper, the waveform designated 1, as the reference, one can see how the standard IS-95 channel filter with a 3 dB corner frequency of 590 KHz and 45 dB of attenuation has shaped the spectrum prior to any window clipping or further filtering. The PAR at 0.01% of the original signal is 9.75 dB. Clipping the signal, using clipping function 301, from a 0.01% PAR of 9.75 dB down to 4.57 dB results in a rise of the out-of-band energy as shown by the waveform designated 2. The clipped signal is then filtered with the resulting spectrum shown by the waveform designated 3. While the ACP is good after the filtering, the peak-to-average ratio has increased to 5.62 dB at 0.01%. Clipping the signal a second time brings the 0.01% PAR back down to 4.66 dB, but produces additional splatter as shown by the waveform designated 4. Note that the splatter is still lower than the original noise floor established by the channel filter.

Figure 6:
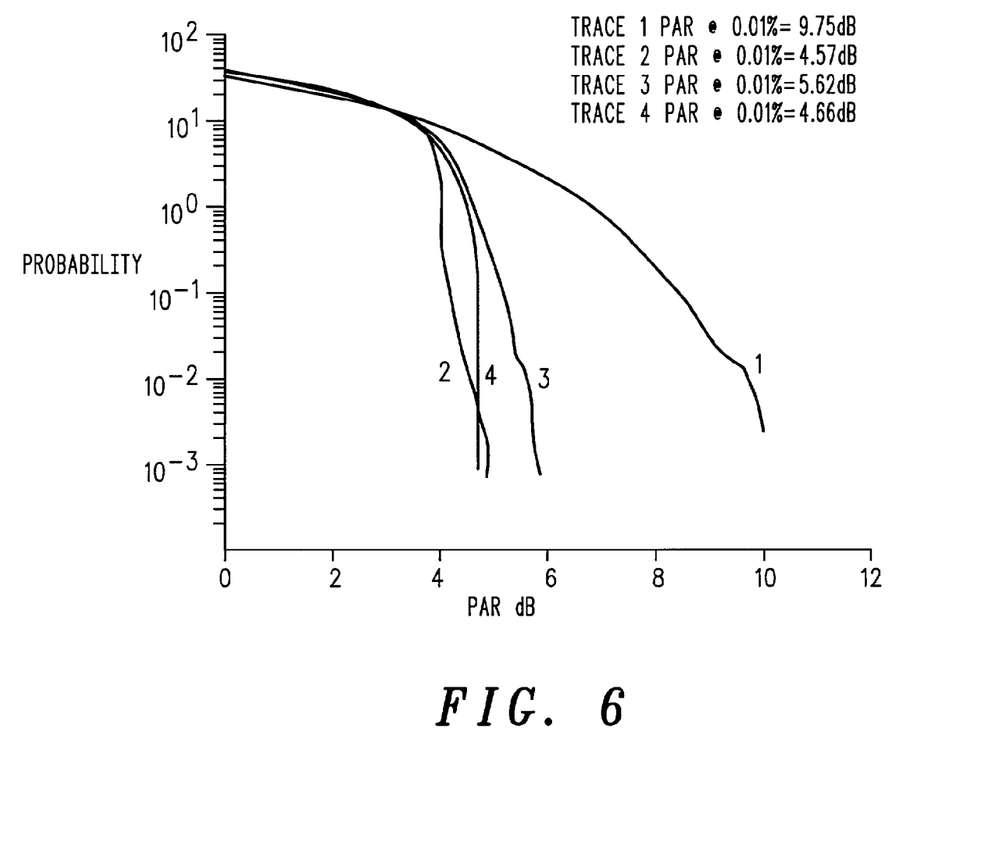

FIG. 6 shows how the peak-to-average ratio changes throughout the processing chain. See the Table below for a summary of various information relevant to the waveforms of FIG. 6. The changes in the peak-to-average ratio can be broken down into changes in the peak power and changes in average power, as shown in the table below. Using waveform 1 as the reference we can see that the clipping operation performed by clipping function 301 as depicted in waveform 2 greatly reduces the peak power of the signal while reducing the average power to a lesser extent. After the signal has been filtered, waveform 3, the average falls slightly due to attenuation in the pass band of the filter, but the peaks increase due to changes in the signal in the complex plane. In an attempt to regain some of the lost PAR reduction, the signal is clipped, albeit lightly, a second time. The result is another dB of reduction in the peak power while the average power remains relatively unchanged as shown in waveform 4.

|  | Point 1 | Point 2 | Point 3 | Point 4 |
|---|---|---|---|---|
| Peak Power (dB) | 0 | −6.430 | −5.754 | −6.909 |
| Peak Power @ 0.01% (dB) | 0 | −6.435 | −5.655 | −6.629 |
| Avg Power (dB) | 0 | −1.255 | −1.525 | −1.539 |

Using the peak reduced waveforms as inputs to a power amplifier the following improvement were measured. At rated output power the clipped waveforms had 6 to 7 dB better ACP performance while maintaining the same efficiency as the non-clipped waveforms. Running the power amplifier an additional 3 dB over rated power with the clipped waveform as the input resulted in an ACP that was identical to the power amplifier running at rated power with the non-clipped waveforms. Driving the power amplifier 3 dB harder resulted in a 50% improvement in efficiency. These results are typical but may vary depending on how much the power amplifier is backed off.

Figure 7:
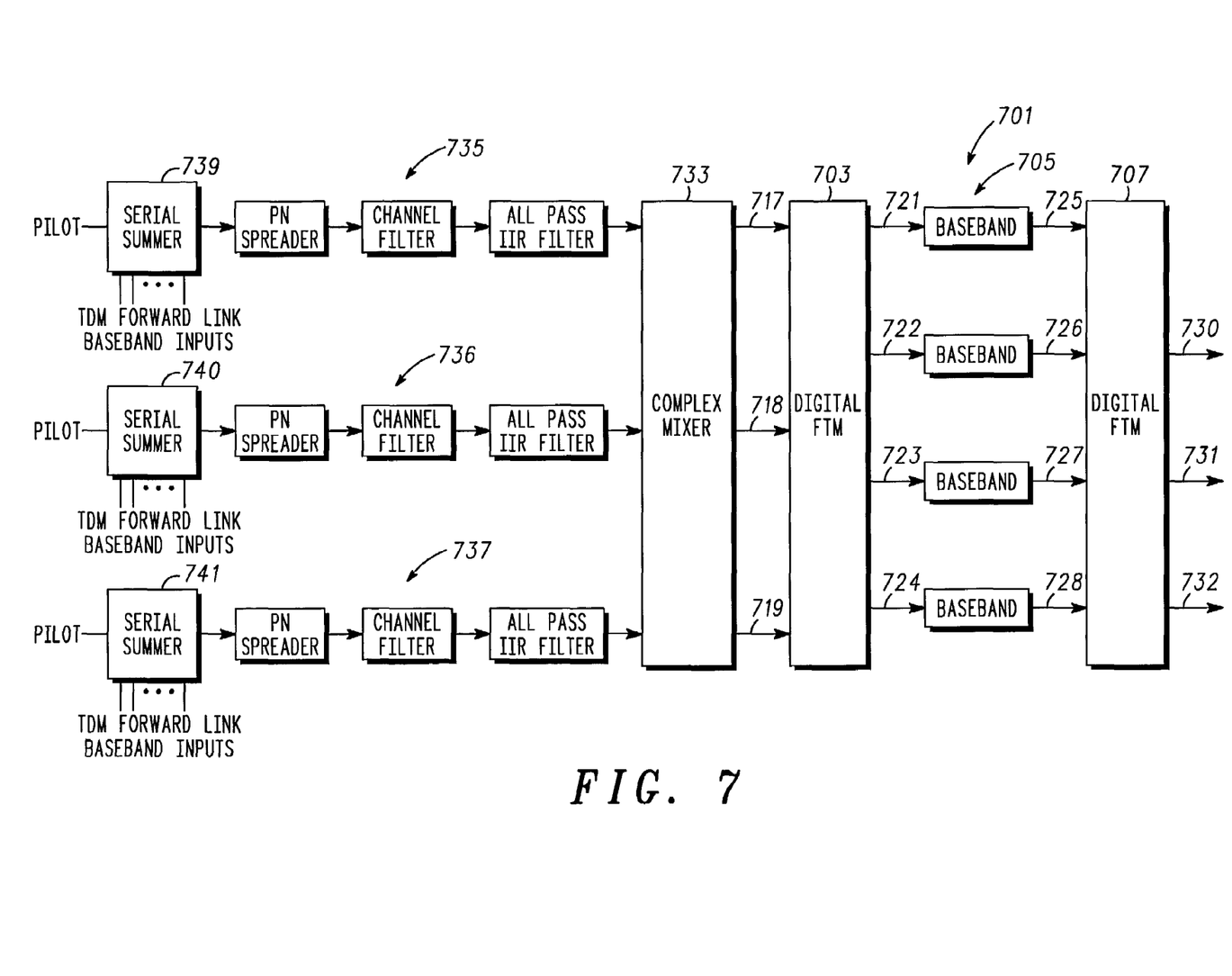
FIG. 7 depicts a block diagram embodiment of a base band signal source suitable for providing input signals for the FIG. 3 apparatus according to the present invention.

FIG. 7 depicts a block diagram embodiment of a base band signal source suitable for providing input signals for the FIG. 3 apparatus or FIG. 2 transmitter. Reference numerals 701–707 and 717–732 correspond one for one with reference numerals 201–207 and 217–232 in the earlier figures. They have been changed here since in this embodiment base band signals 717–719 for three sectors in a code division, time division, or frequency division multiple access cellular system are being generated and applied to the digital FTM 703 and after processing by the processing unit 705 output from the second digital FTM 707 as 732–730 respectively, due to the inversion properties of FTMs. To develop the base band input signals 717–719 the TDM forward link base band input signals each representative of a payload signal such as a voice or data channel and up to 61 of them are summed along with various known CDMA overhead information such as a pilot at a serial summer 739–741 respectively. The output of the summers 739–741 is in each case a serial bit stream that is then passed through known CDMA base band processing 735–737, each including the PN spreader, channel filter, and all pass filter blocks. These three signals are coupled to a complex mixer 733 that is not particularly relevant but in the event that the signal applied to the mixer is supposed to be used to modulate two different carriers or be transmitted on two different carriers for the sector will frequency convert the appropriate portions of the bit stream in order to accomplish this objective. The outputs of the mixer 733 are applied as 3 inputs to the FTM, meaning that the fourth input is not used and will be treated as zero in the above equations for a digital FTM. Thus the digital FTM 707 will only have three non-zero outputs as shown.

Figure 8:
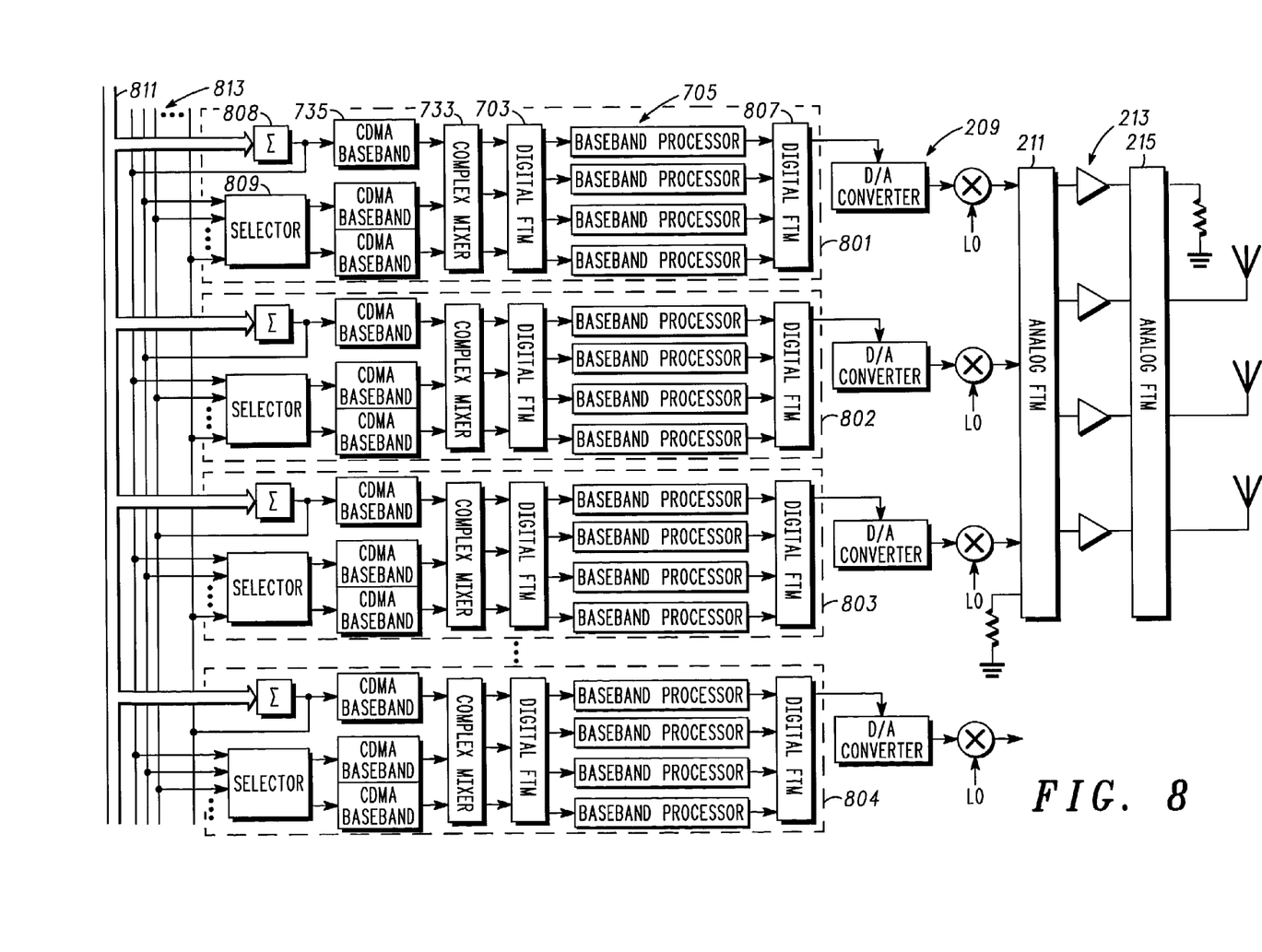
FIG. 8 illustrates another embodiment of the FIG. 7 signal source.

Referring to FIG. 8 another embodiment of providing the input signals for the apparatus 701 collectively comprised of 703, 705, and 707 (see FIG. 7) as well as generating the output base band signals (see FIG. 2) to be applied to the mixer 209 and thus radio frequency signals for input to the analog FTM 211 to provide amplifier input signals for amplifier 213 and thus amplified output signals for application to the analog FTM 215 in order to provide the transmit signals for driving the antennas is depicted. FIG. 8 depicts a situation, such as, providing three base band signals for each of three sectors, such as sectors 107, 109, 111 and the routing and signal construction processes for driving a power amplifier or transmitter that uses analog FTMs in order to provide redundancy or any other advantages that may accrue to load sharing. FIG. 8 depicts the two 4×4 matrices 211, 215 with mirrored input and output signals as we would expect where for example the lower input and upper output are terminated and the upper 3 inputs and lower 3 outputs are coupled to respective radio frequency signal sources and loads or antennas. The input signals or radio frequency signals are provided by the three mixer lineups that are part of mixer 209. Mixer 209, specifically the three digital to analog converters are each driven by base band output signals which are provided one each from the output base band generators 801, 802, and 803.

Referring specifically to output base band generator 801, this function or generator is identical in operation and architecture to the apparatus of FIG. 7 excepting that the two serial summers 740 and 741 have been replaced by the signal selector 809, the output of serial summer 808 is returned to one of the paths in bus 813 and the digital FTM 807 only outputs one base band output signal. By analogy and observation output base band generators 802–804 are constructed and operate similarly. This overall architecture is advantageously deployed when it is desired to have each base band generator provide only one base band signal, such as an output base band signal for one of a plurality of sectors or it is desired to have or provide some redundancy for the base band generators. This redundancy can be provided, for example, by providing a routing or switching function (not shown) between the output of the base band generators and the plurality of digital to analog converters. Thus, if base band generator 803 experiences a failure, generator 804 can be set up via its serial summer, signal selector, and output FTM; to sum the appropriate TDM forward link base band inputs from bus 811, return the result to the bus 813, select the proper signals from the bus 813 (in this example the signals from base band generators 801, 802), and select the proper output from the digital FTM to route to the proper DAC. For example if 801 is set up to provide an output base band signal corresponding to, for example, sector 1, and 802 to sector 2, then 803 and now 804 after being set up, would provide sector 3. The serial summers provide the same function as the serial summers of FIG. 7 in that they serially sum the forward link traffic, typically TDM, destined for their respective carrier and antenna, etc. together with the relevant CDMA overhead such as pilots, but, by observation, each returns its respective serially summed bit stream to its respective trace or path in bus 813. By the same token the signal selector corresponding to a particular summer is coupled to all paths on bus 813 except the one driven by the serial summer. Thus a controller (not shown) can control the signal selector 809 to select the appropriate serially summed signals (here the signals from 802, 803) from bus 813 in order to provide the proper base band input signals for the input digital FTM 703. The processor or base band processor 705 has the correct signals in order to provide the output digital FTM 807 with the appropriate signals such that its output base band signal will represent the desired one. Note the other available outputs from this digital FTM can be discarded. By analogy 802–804 operate similarly and redundancy is available or provided for the base band generators. This is an alternative approach to that of FIG. 7 where each serial summer selects the proper forward link TDM signals and is a way of providing the proper base band signals to do the proper base band processing in order to provide a suitable processed output base band signal in order to improve the PARs seen by the amplifier 213.

As a summary and in the context of the methodology that we have discussed with reference to the apparatus figures the following description of a preferred method is provided. We have discussed and described a method of reducing peak power requirements in a multi-channel transmitter. This method includes coupling at least one input signals to a Fourier Transform Matrix (FTM), preferably a digital FTM, to provide a plurality of FTM output signals each comprising a combination of phase shifted versions of the one or more input signals. Then the method processes the plurality of FTM output signals by limiting a peak value for each of the FTM output signals to provide a plurality of peak limited output signals, then decomposes the peak limited output signals to provide one or more output base band signals, each of the output base band signals corresponding to one of the input signals and then converts the output base band signals from a base band frequency to a transmission radio frequency to provide a plurality of radio frequency signals. From there the process generates a plurality of amplifier input signals, each comprising a combination of phase shifted versions of the one or more radio frequency signals, where the amplifier input signals, preferably, correspond to the peak limited output signals. Next, the method amplifies the amplifier signals to provide a plurality of amplified output signals using a power amplifier having a plurality of amplifiers, each amplifier having an input coupled to one of the plurality of the radio frequency signals and providing one of the amplified output signals. Thereafter decomposing the plurality of amplified output signals to provide at least one and preferably a plurality of transmit signals corresponding one to one with the output base band signals is undertaken.

In the preferred form the method includes providing a plurality of output signals using a first digital FTM and decomposing the peak limited output signals using a second digital FTM, where the first digital FTM is coupled to a plurality of input signals each, comprising a code division, time division, or frequency division multiple access base band signal for transmission on a radio channel. The second FTM provides and a mixer converts a plurality of output base band signals to provide a plurality of radio frequency signals that are utilized to generate the plurality of amplifier input signals, each comprising a combination of phase shifted versions of the radio frequency signals. The process of decomposing the plurality of the amplified output signals provides a plurality of transmit signals corresponding one to one with the plurality of output base band signals.

The method, preferably limits the peak value for each of the output signals 225–228 by clipping, with a windowed clipper, each of the output signals according to a predetermined function that lowers the probability that the peak value will exceed a predetermined value for each of the output signals 225–228. Then filtering each of the output signals to reduce undesired signals resulting from the clipping provides additional improvement in ACP. For more improvement in PAR, the method, after the process of filtering, undertakes a second step of clipping a filtered version of each of the plurality of output signals to further limit peaks of the peak limited output signals. In addition the method is arranged to select the plurality of input signals in certain embodiments, such as, where the input signals are base band signals for a plurality of sector antennas that are driven by the multi-channel transmitter.

The methods and apparatus, discussed above, and the inventive principles and concepts thereof are intended to and will alleviate problems caused by prior art transmitters using FTMs and conventional base band processing techniques. Using these principles of developing at base band, signals that are faithful representations of signals that power amplifiers will see at their input and processing those signals for lower or reduced peak to average ratios has shown a dramatic improvement in transmitter performance.

Various embodiments of method and apparatus for reducing peak to average ratios and particularly improving crest factors so as to facilitate and provide for improved transmitter performance and reduced peak power requirements for the transmitters have been discussed and described. It is expected that these embodiments or others in accordance with the present invention will have application to many wide area networks. Using the inventive principles and concepts disclosed herein advantageously allows or provides for low cost high availability multi-channel transmitters that will be required for current and future communications systems and this will be beneficial to both users and providers of such systems.

This disclosure is intended to explain how to fashion and use various embodiments in accordance with the invention rather than to limit the true, intended, and fair scope and spirit thereof. The invention is defined solely by the appended claims, as may be amended during the pendency of this application for patent, and all equivalents thereof.

What is claimed is:

1. An apparatus for processing base band signals to reduce peak power requirements for a multi-channel transmitter, the apparatus comprising in combination:
    a first Fourier Transform Matrix (FTM) coupled to at least one input signal for providing a plurality of output signals each comprising a combination of phase shifted versions of said at least one input signal;
    a processing unit coupled to said output signals for limiting a peak value for each of said output signals to provide a plurality of peak limited output signals, and
    a second FTM coupled to said peak limited output signals for decomposing said peak limited output signals to provide a plurality of output base band signals suitable for generating a plurality of low level signals for driving the multi-channel transmitter, each of said output base band signals corresponding to one of said input signals.

2. The apparatus for processing base band signals of claim 1 further implemented in an integrated circuit form.

3. The apparatus for processing base band signals of claim 1 wherein said first FTM and said second FTM further comprise a first digital FTM and a second digital FTM, said first digital FTM coupled to a plurality of input signals that each comprise a base band signal for transmission on a radio channel.

4. The apparatus for processing base band signals of claim 3 wherein said first FTM is further coupled to said plurality of input signals, each comprising one of a code division, a frequency division, and a time division multiple access.

5. The apparatus for processing base band signals of claim 4 wherein said plurality of input signals each comprises a base band signal for a sector of a plurality of sectors.

6. The apparatus for processing base band signals of claim 1 wherein said processing unit further comprises a clipping function that operates to limit peaks of said each of said output signals according to a predetermined function that lowers the probability that said peak value will exceed a predetermined value for said each of said output signals.

7. The apparatus for processing base band signals of claim 6 wherein said processing unit further comprises a filter, coupled to said clipping function, to reduce undesired signals resulting from said clipping function.

8. The apparatus for processing base band signals of claim 7 wherein said processing unit further comprises a second clipping function coupled to an output of said filter that operates to further limit peaks of said each of said output signals.

9. The apparatus for processing base band signals of claim 1 further comprising a signal selector for selecting a plurality of input signals to be coupled to said first FTM.

10. The apparatus for processing base band signals of claim 9 wherein said signal selector operates to select said plurality of input signals corresponding to base band signals for a plurality of sectors that are driven by the multi-channel transmitter.

11. A multi-channel transmitter having reduced peak power requirements comprising in combination:
    an apparatus for processing base band signals to reduce peak to average parameters for said base band signals, the apparatus further comprising: a first Fourier Transform Matrix (FTM) for providing a plurality of FTM output signals each comprising a combination of phase shifted versions of at least one input signals; a processing unit for limiting a peak value for each of said FTM output signals to provide a plurality of peak limited output signals, and a second FTM for decomposing said peak limited output signals to provide at least one output base band signals, each of said at least one output base band signals corresponding to one of said at least one input signals;
    a mixer for converting each of said at least one output base band signals to a radio frequency signal to provide at least one radio frequency signals;
    a first analog FTM for providing a plurality of amplifier input signals, each comprising a combination of phase shifted versions of said at least one radio frequency signals;
    a power amplifier having a plurality of amplifiers to provide a plurality of amplified output signals, each amplifier having an input coupled to one of said plurality of said amplifier input signals and providing one of said plurality of said amplified output signals; and a second analog FTM coupled to said plurality of amplified output signals to provide at least one transmit signals corresponding one to one with said at least one output base band signals.

12. The multi-channel transmitter of claim 11 wherein said first FTM and said second FTM further comprise a first digital FTM and a second digital FTM, said first digital FTM coupled to a plurality of said input signals each comprising a base band signal for transmission on a radio channel, said second FTM providing and said mixer converting a plurality of output base band signals to provide a plurality of radio frequency signals, said first analog FTM providing said plurality of amplifier input signals, each comprising a combination of phase shifted versions of said plurality of said radio frequency signals, and said second analog FTM providing a plurality of transmit signals corresponding one to one with said plurality of output base band signals.

13. The multi-channel transmitter of claim 12 wherein said first FTM is further coupled to said plurality of said input signals, each comprising one of a code division, a frequency division, and a time division multiple access base band signal.

14. The multi-channel transmitter of claim 13 wherein said plurality of said input signals each comprises a base band signal for a sector of a plurality of sectors.

15. The multi-channel transmitter of claim 11 wherein said processing unit further comprises a clipping function that operates to limit peaks of said each of said FTM output signals according to a predetermined function that lowers the probability that said peak value will exceed a predetermined value for said each of said FTM output signals.

16. The multi-channel transmitter of claim 15 wherein said processing unit further comprises a filter, coupled to said clipping function, to reduce undesired signals resulting from said clipping function.

17. The multi-channel transmitter of claim 16 wherein said processing unit further comprises a second clipping function coupled to an output of said filter that operates to further limit peaks of said each of said FTM output signals.

18. The multi-channel transmitter of claim 11 wherein said apparatus for processing base band signals further comprising a signal selector for selecting a plurality of input signals to be coupled to said first FTM.

19. The multi-channel transmitter of claim 18 wherein said apparatus for processing base band signals further including said signal selector operates to select said plurality of input signals corresponding to base band signals for a plurality of sector antennas that are driven by the multi-channel transmitter.

20. A method of reducing peak power requirements in a multi-channel transmitter, the method including the steps of:
providing a plurality of output signals each comprising a combination of phase shifted versions of at least one input signals;
limiting a peak value for each of said output signals to provide a plurality of peak limited output signals,
decomposing said peak limited output signals to provide at least one output base band signals, each of said at least one output base band signals corresponding to one of said at least one input signals;
converting each of said at least one output base band signals to a radio frequency signal to provide at least one radio frequency signals;
generating a plurality of amplifier input signals, each comprising a combination of phase shifted versions of said at least one radio frequency signals, said amplifier input signals corresponding to said peak limited output signals;
amplifying said plurality of said amplifier signals to provide a plurality of amplified output signals using a power amplifier having a plurality of amplifiers, each amplifier having an input coupled to one of said plurality of said radio frequency signals and providing one of said plurality of said amplified output signals; and
decomposing said plurality of said amplified output signals to provide at least one transmit signals corresponding one to one with said at least one output base band signals.

21. The method of claim 20 wherein said providing a plurality of output signals uses a first digital FTM and said decomposing said peak limited output signals uses a second digital FTM, said first digital FTM coupled to a plurality of input signals each, comprising one of a code division, a time division, and a frequency division multiple access base band signal for transmission on a radio channel, said second FTM providing and a mixer converting a plurality of output base band signals to provide a plurality of radio frequency signals, generating said plurality of amplifier input signals, each comprising a combination of phase shifted versions of said plurality of said radio frequency signals, and said decomposing said plurality of said amplified output signals providing a plurality of transmit signals corresponding one to one with said plurality of output base band signals.

22. The method of claim 20 wherein said limiting said peak value for said each of said output signals further comprises clipping said each of said output signals according to a predetermined function that lowers the probability that said peak value will exceed a predetermined value for said each of said output signals.

23. The method of claim 22 wherein said limiting said peak value for said each of said output signals further comprises filtering after said clipping said each of said output signals to reduce undesired signals resulting from said clipping.

24. The method of claim 23 wherein said limiting said peak value for said each of said output signals further comprises, after said filtering, a second step of clipping a filtered version of said each of said plurality of said output signals to further limit peaks of said peak limited output signals.

25. The method of claim 20 further comprising a step of selecting a plurality of said input signals.

26. The method of claim 25 wherein said selecting said plurality of input signals correspond to selecting base band signals for a plurality of sector antennas that are driven by the multi-channel transmitter.

* * * * *